US007971411B2

(12) United States Patent
Commins (10) Patent No.: US 7,971,411 B2
(45) Date of Patent: Jul. 5, 2011

(54) DOUBLE-DUTY, HOLD-DOWN SYSTEM (76) Inventor: Alfred D. Commins, Friday Harbor, WA (US)

( * ) Notice: Subject to any disclaimer, the term of this patent is extended or adjusted under 35 U.S.C. 154(b) by 153 days.

(21) Appl. No.: 12/255,826

(22) Filed: Oct. 22, 2008

(65) Prior Publication Data
US 2009/0107082 A1  Apr. 30, 2009

Related U.S. Application Data (60) Provisional application No. 60/982,372, filed on Oct. 24, 2007.

(51) Int. Cl.
*E04H 12/00* (2006.01)
*E02D 27/00* (2006.01)
(52) U.S. Cl. ............... 52/745.21; 52/653.1; 52/293.3
(58) Field of Classification Search ............... 52/167.1, 52/745.21, 223.14, 293.3, 295, 712, 713, 52/573.1, 167.4, 299, 236.9
See application file for complete search history.

(56) References Cited

U.S. PATENT DOCUMENTS

| 6,513,290 | B2 | 2/2003 | Leek | |
|---|---|---|---|---|
| 6,625,945 | B2 | 9/2003 | Commins | |
| 7,007,432 | B2 * | 3/2006 | Commins | 52/293.3 |
| 7,150,132 | B2 | 12/2006 | Commins | |
| 7,287,355 | B2 * | 10/2007 | Commins | 52/223.14 |
| 7,634,888 | B2 * | 12/2009 | Cloyd et al. | 52/653.1 |
| 7,658,049 | B2 * | 2/2010 | Cloyd et al. | 52/653.1 |

OTHER PUBLICATIONS

Wood Constructions Connectors, Simpson Strong-Tie. C-2007, Dec. 2006, pp. 35-38.
Anchor Tiedown System for Multi-story Overturning Restraint, Simpson Strong Tie, C-ATS07, Jul. 2007, pp. 11-14, 18, 21, 34.

* cited by examiner

*Primary Examiner* — Basil Katcheves
*Assistant Examiner* — Beth Stephan
(74) *Attorney, Agent, or Firm* — Pate Baird, PLLC (57) ABSTRACT

A method for securing a building to a foundation provides hold-down units that perform double-duty by acting as a compressive load on a floor immediately therebelow due to the force of a seat or base portion thereof. Meanwhile, a flange portion of each hold-down device extends upward to fasten to the upright members in an upper floor applying tension thereto. Thus, an anchoring rod extending through multiple floors of the shear walls may reduce the number of total hold-down devices by an amount approaching half that otherwise required. Likewise, the number of more expensive, automatic, take-up devices used is reduced by approximately half.

20 Claims, 8 Drawing Sheets

DOUBLE-DUTY, HOLD-DOWN SYSTEM

RELATED APPLICATIONS

This application claims the benefit of co-pending U.S. Provisional Patent Application Ser. No. 60/982,372, filed on Oct. 24, 2007.

BACKGROUND

1. Field of the Invention

The present invention relates to building construction, and more specifically, to apparatus for anchoring shear walls to foundations and lower floors.

2. Background

Strong winds and earthquakes subject walls and others elements of a building to tremendous forces. If these forces are not distributed to the proper elements or structures capable of withstanding such force, the building may be torn apart. Foundations are often the strongest element of a building. Securely tying the walls of a building to the foundation greatly improves structural performance during periods of strong wind or earthquake. Securement promotes single body motion limiting whiplash amplification otherwise often resulting in structural failure.

Under extreme conditions, a building may be violently loaded or shaken back and forth in a lateral (side to side) direction. If a shear wall is tightly restrained at its base, loads may be smoothly transferred to the foundation. The loads may then be resolved in the foundation, where they appear as tension and compression forces.

Buildings are often composed of long walls, (walls with a length greater than the height) and short walls (walls that have a length shorter than the height). The tendency for a wall to lift vertically off a foundation is inversely proportional to the length of the wall. Tall narrow shear walls, which may be found in nearly all homes, act as lever arms and may magnify an imposed load. In certain instances, the actual load on the securement system may be magnified to several times the originally imposed load.

An as-built building is generally not the building that will be sustaining loads induced by wind or by earthquake shaking. Wood components of the building structure, including floors, joists, sill plates, top plates, and studs, will shrink. Shrinkage varies greatly but ranges typically from about one-quarter inch per floor (story) under the best of conditions, to well over one inch depending on the total cross-grain stack up (depth) of wood.

Wall securement may reduce or prevent lateral and vertical motion between the walls and the foundation. Additionally, it may be necessary to support the wall against forces that would tend to distort the wall's general rectangular shape. Building codes often require external and load bearing walls to be shear resistant by providing a plywood plane to support shear forces that may be imposed on the wall. Many times, building codes also require lateral and vertical securement of a wall to the foundation. Lateral and vertical securement may be accomplished by employing hold-downs, also referred to as tiedowns.

Hold-down systems are employed to secure walls of upper levels to walls of lower levels, as well as walls to foundations. Again the principle is to secure the entire structure to the foundation where structural forces can best be resolved. However, lower levels can present amplification of structural weaknesses to upper levels. If a hold-down system installed on a given level cannot compensate for all shrinkage and crushing affecting that level, structural weaknesses may be amplified on adjacent levels. Hold-down systems need to be able to compensate for structural weaknesses throughout the structure, and not just within a given level.

Moreover, hold-down systems can be difficult to install and expensive to fabricate. Some hold-down systems require assembly within narrow tolerances, making assembly difficult and time consuming. Other hold-down systems cannot compensate for structural weaknesses throughout the structure, causing an overload of a hold-down system on a given level. Some systems by major suppliers, when applied to multi-story buildings may accumulate slack with each floor. Some systems cannot hold down the highest floor of a building due to their operating principles and connection mechanisms Yet other hold-down approaches advance discretely between pre-determined, locking locations. Thus, at all points between the discreet locking points, such systems, leave a certain amount of slack, greatly compromising their effectiveness.

Hold-down systems are distributed about a building's floor plan and perimeter. They may also be distributed throughout the height of the building, in an attempt to secure each floor to the one below or to the foundation. Thus, the additive cost may be substantial for the numerous locations in a building warranting placement of hold-downs.

A need exists for a hold-down system that may be easily installed and utilizes the full potential of the system over the entire structure. It would be a further advancement to provide a hold-down system that may be produced and installed in greater quantities with greater speed and less expense. Likewise, it would be a further advance to develop a method of locating and installing hold-downs that would give the maximum rigidizing effect with a minimum number of hold-downs actually installed.

BRIEF SUMMARY AND OBJECTS OF THE INVENTION

In accordance with the foregoing, certain embodiments of an apparatus, system, and method in accordance with the invention provide a continuous hold-down system useful for multi-story applications, that is easily and quickly installed. The hardware involved with the foregoing systems, apparatus, and methods may be mass produced and installed comparatively inexpensively.

In certain embodiments, the apparatus, systems, and methods in accordance with the present invention may include a foundation with an anchor composed of rods coupled together to extend through one or more levels of a building or other structure. The anchor, implemented as a series of rods coupled together, may pass through one or more held locations. Each held location is provided with a station receiving a hold-down element securing that held location to the rod, and thus to the foundation.

While previous hold-down systems may be considered useful for similar purposes, the hold-down system described herein is a more effective and efficient system. For example, each hold-down may be capable of double duty. Each hold-down may be installed so that its base portion is located above the top plate of one floor, providing a compression load to hold that floor. Meanwhile, flanges or strap portions extend above the base of the hold-down.

Suitable fasteners, such as nails, screws, or the like connect the flanges to uprights (e.g. studs) in the next floor up. The fasteners are numbered and rated to hold necessary shear loads between the flange and the upright. Thus, these flanges provide tension loading of upright members in the next floor above the one held by the base portion. Each hold-down can anchor two floors when properly sized, rated, and installed.

At the held locations, take-up units may act as extensible washers between a station therebelow and a fastener thereabove. The fastener secures to the rod, capturing the take-up unit below it, on top of an anchoring station. Thus the take-up devices help maintain tension throughout the system, essentially removing subsequent slack arising in the securement system anchoring the entire structure to the foundation. Securing the structure to the foundation without slack, and taking up future slack, enables the structure to better withstand various forces acting on the structure. These forces are transferred to the foundation where they can be dissipated more efficiently.

Previous hold-down systems may not contain certain of the features in accordance with the invention. Moreover, no system provides all the structures of the hardware, nor all the steps of the methods in accordance with the invention.

Thus, for example, other prior art systems attempting to solve the long-term anchoring problem result in isolating each individual level of a building. These and other systems require more hardware on each floor, may inadequately protect and anchor each floor, or both.

Instead of such solutions, the apparatus, systems, and methods in accordance with the invention, using a continuous rod, allow reduced hardware without sacrificing building anchoring capacity. Meanwhile, when provided with take-up devices, the system may compensate for shrinkage or crushing occurring on any level of the building. Thus, if shrinkage or crushing on one level exceeds the capacity of the system on that level, the system on other levels can compensate for the excess.

The system may also take advantage of unique, take-up units. Individual take-up units may be stackable, providing greater ability to compensate for abnormally large amounts of shrinkage and crushing. This is especially helpful in compensating for shrinkage and crushing as the number of levels increases for any building design. Therefore, if one of the upper levels of the building has one or more extra take-up units stacked, those units can compensate for any excess shrinkage or crushing throughout the building therebelow.

This may also be especially helpful on upper levels of a building because shrinkage and crushing on lower levels tends to undo the protection provided for upper floors in some prior art systems. Moreover, the whiplash effect of building motion is accentuated on upper levels. Thus, any accumulated slack available to upper floors can be disastrous.

BRIEF DESCRIPTION OF THE DRAWINGS

The foregoing and other features and benefits of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

Referring generally to FIGS. 1-8, those of ordinary skill in the art will, of course, appreciate that various modifications to the details of the Figures may easily be made without departing from the essential characteristics of the invention. Thus, the following description of the Figures is intended only by way of example, to simply illustrate certain embodiments consistent with the invention, and is not intended to limit the scope of the invention.

The scope of the invention is as broad as claimed herein. The illustrations are merely representative of certain, illustrative embodiments of the invention. Those embodiments of the invention will be best understood by reference to the drawings, wherein like parts are designated by like numerals throughout. A trailing letter after a reference numeral in the Figures simply indicates a specific instance of the item otherwise indicated by the reference numeral.

Several Figures display an automatic take-up unit. This device is described fully in U.S. Pat. No. 6,390,747 issued May 21, 2002, to this inventor, and incorporated herein by reference. Likewise, a variety of methods and apparatus for making and using balanced hold-downs to anchor walls of building structures are disclosed in U.S. Pat. No. 6,625,945 issued Sep. 30, 2003 to the inventor, which patent is hereby incorporated by reference.

In discussing the Figures, a coordinate system will aid in the description of several of the embodiments in accordance with the present invention. For example, in FIG. 1, coordinate axes 21 may be defined by a wall as a longitudinal direction 21a along the wall. A lateral direction 21b passes through or across the wall. The transverse direction 21c passes up and down the wall height. The longitudinal 21a, lateral 21b, and transverse directions 21c are directions substantially orthogonal to one another.

In the description to follow, the embodiments will be oriented so they are aligned and primarily configured to oppose or transfer longitudinal loads of shearing forces by precluding or resisting motion in a transverse direction 21c. Embodiments in accordance with the present invention are secured in a longitudinal direction to resist or transfer forces and loads along more than one axis 21 simultaneously.

Several embodiments, however, may be particularly well suited to resisting or transferring loads in a given direction. Typically, a lateral load into one wall results in a longitudinal load against an adjoining wall extending at a right angle thereto. Each of these is resisted by virtue of transverse loading supported by a hold-down device, often with an automatic take-up device to take up accumulated slack in the connections.

Thus, shear forces are supported in the plane of the longitudinal axis 21a and the transverse axis 21c. Nevertheless, the forces are resolved into the anchors extending in the transverse direction 21c. Thus, the anchors may be loaded in shear at the foundation and various other locations, but their principal loading will be in tension along the transverse axis 21c as they secure a shear wall to the foundation.

Figure 1:
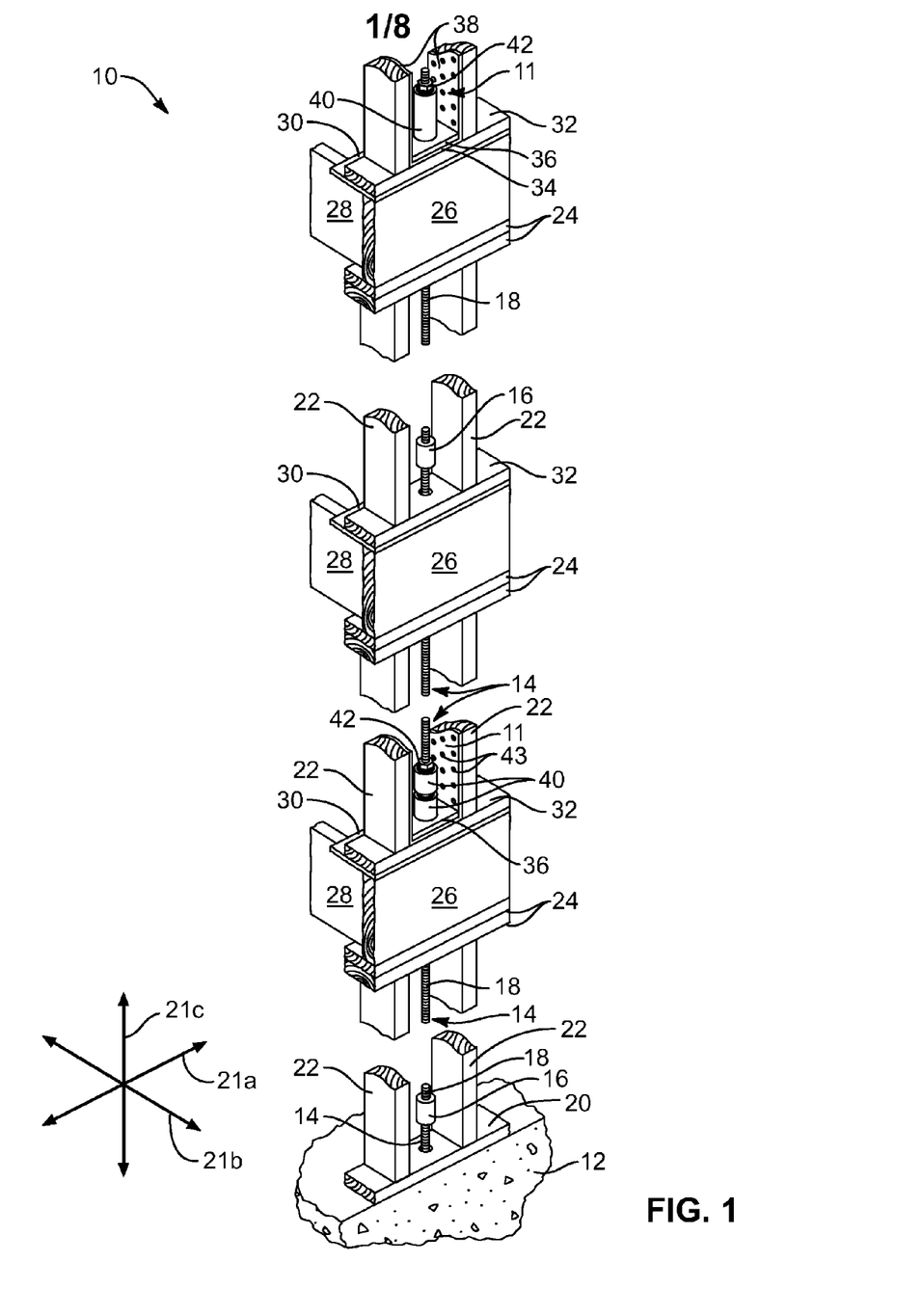
FIG. 1 is a perspective view of one embodiment of a system and method in accordance with the invention, anchoring multiple stories with double-duty hold-down units.

Referring to FIG. 1, a system 10 in accordance with the present invention may include a foundation 12 extending in a longitudinal direction 21a. The foundation 12 may be any structural foundation 12 used in construction, typically having a thickness in a lateral direction 21b and supporting the weight of a building in a transverse direction. The foundation 12 may be provided with anchors 14 located along a perimeter of the building, each anchor 14 extending transversely 21c from the foundation 12. An anchor 14 may be composed of a single threaded rod 18 or multiple threaded rods 18 secured together with a coupler 16.

Typical materials for the foundation 12 include concrete, steel, stone, and wood. The anchor 14 generally begins as a rod 18 embedded in a concrete foundation 12 (often welded to reinforcing bar) and extending transversely 21c out from the foundation 12. The anchor 14 may be composed of numerous rods 18. A coupler 16 may be attached to the distal end (away from the foundation 12) of one threaded end of a rod 18 and the proximal end (toward the foundation 12) of another threaded end of a rod 18, thereby extending the anchor 14 transversely 21c.

Using this method, the anchor 14 is extended through successive levels of the structure and provides for transferring to the foundation 12 forces applied to the structure, or shear wall. Typical materials for the threaded rod 18 include steel, other metals, reinforced composites, and plastic. Typical rods 18 may be continuously threaded along the length of the rod 18, or be threaded only on the end portions of the rod 18 leaving the center portion smooth. Typical materials for the coupler 16 include steel and plastic, and will generally match the material used for the threaded rod 18. The coupler 16 can join rods 18 of the same diameter, or the coupler 16 can join rods 18 of varying diameters.

A sill plate 20 is a member proximate the foundation 12 and extending parallel or longitudinally 21a with the foundation 12. The sill plate 20 provides a base for vertical framing members 22, which extend transversely 21c. The vertical framing members 22 have a proximate end (toward the foundation 12) and a distal end opposite. A top plate 24 is attached to the vertical framing members 22 at the distal end of the framing members 22 and extends longitudinally 21a.

A shear wall may be formed by attaching a shear member, such as a sheet or sheets of plywood or other structural material to connect the sill plate 20, vertical framing members 22 (e.g. studs 22), and top plate 24. Numerous top plates 24 may be used. However, a top plate 24 may support a header 26, extending longitudinally 21a, and one or more trusses 28, beams 28, or joists 28, extending laterally 21b. The header 26 and the beams 28 or trusses 28 (e.g. joists 28, beams 28, etc.) may support flooring 30. This configuration generally describes an initial level of a structure.

A base plate 36 is a member proximate the flooring 30 and extending longitudinally 21a. The base plate 36 (bearing plate 36) serves a function similar to the sill plate 20 by providing a base for vertical framing members 22 extending transversely 21c. The vertical framing members 22 have a proximate end (toward the foundation 12) and a distal end opposite.

A top plate 24 is attached to the vertical framing members 22 at the distal end of the framing members 22 and extends longitudinally 21a. A shear wall may be formed by attaching a sheet or sheets of plywood or other structural material to the base plate 36, vertical framing members 22, and top plate 24. Numerous top plates 24 may be used. However, a top plate 24 may support a header 26, extending longitudinally 21a, and one or more trusses 28 or joists 28, extending laterally 21b. The header 26 and the joists 28 or trusses 28 may support flooring 30. This configuration generally describes a subsequent level of a structure. Obviously, subsequent levels may be added to other subsequent levels creating a multi-level structure.

The sill plate 20, the vertical framing member 22, the top plate 24, the sill plate 32 (sill plate 32 on an upper floor), the header 26, and the trusses 28 make up the typical framing components and may be any structural support member used in construction. They may have a variety of cross-sectional configurations, such as rectangular, circular, I-beam, or any other suitable design. Typical materials include wood and metal. However, embodiments in accordance with the present invention may be applied to any material having the desired structural characteristics.

The anchor 14 extends transversely 21c through the sill plate 20 of an initial level. The sill plate 20 may be secured to the foundation 12 directly or indirectly by the anchor 14, with or without a take-up unit 40. The anchor 14 extends transversely 21c through any structure to be retained, and may engage a take-up unit 40 secured in an appropriate place along the anchor 14 by a retainer 42. A take-up unit 40 may be placed around the anchor and rest upon the sill plate 20, or rest upon a bearing plate 36. However, economy and structural durability are better served by locating the retainer above the sill plate.

The bearing plate 36 may be in the form of a plate or washer and is typically steel, but may be made of any suitable material. The take-up unit 40 is axially independent of the anchor 14, meaning that it does not engage the rod 18 or anchor 14 directly. It is constrained along the length of the rod 18 or anchor 14 only by a retainer 42, bearing plate 36, or the like. Thus it supports quick and easy installation of the take-up unit 40. The take-up unit 40 is secured in place along the anchor 14 between the surface to be retained, sill plate 20 or bearing plate 36, and a retainer 42 proximate the take-up unit 40 only by these items themselves. The retainer 42 threadedly engages the anchor 14 to keep the take-up unit 40 in contact with the sill plate 20 or bearing plate 36. The take-up unit 40 extends transversely 21c to maintain contact between the sill plate 20 and the foundation 12.

The anchor 14 may be extended using a coupler 16 and a rod 18. The coupler 16 may threadedly attach to the anchor 14, and then threadedly attach to the threaded rod 18. This method can be used to extend the anchor 14 through the sill plate 20 and top plate 24 of the initial level of a structure. The use of a take-up unit 40 on any level is optional, depending on the design of the building and the intention of the builder. A take-up unit 40 acting to secure every level has been shown effective. In accordance with the invention, a hold-down is not required on every level.

The anchor 14 extends transversely 21c through the base plate 36 of a subsequent level. The base plate 36 may be secured to the structure using a take-up unit 40. The take-up unit 40 may be placed around the anchor and rest upon the base plate 32, or rest upon a bearing plate 36. which bearing plate 36 may be in the form of a plate or washer and is typically steel, but may be any suitable material.

Continuing to Refer to FIG. 1, while referring generally to FIGS. 1-8, a system 10 and method in accordance with the invention may include hold-downs 11 secured to a foundation 12 of a building. In the illustrated embodiment, and anchor 14 extends from a location secured to the foundation 12. The anchor 14 may be extended through a series of couplers 16 and rods 18 in order to pass through all the floors of a building.

Typically a system 10 in accordance with the invention will provide a system of rods 18 extending upward through the shear walls of a building. For example, a sill plate 20 on the foundation 12 of a building may support uprights 22, commonly called studs 22. The studs 22 may extend upward to terminate against a top plate 24 formed of one or more boards. Typically, a top plate 24 may be formed of the same material as the studs 22 or uprights 22. In other embodiments, a header 26 may sit on the top plate 24. A header 26 may act as a beam of increased depth and improved section modulus in order to span an opening such as a door, window, or the like.

In certain embodiments, a header 26 may be secured to a series of joists 28 extending laterally 21b away therefrom. Considering the length of a wall to extend in a longitudinal direction 21a, joists 28 may extend in a lateral direction 21b. Meanwhile, the hold-down 11 acts to secure the shear wall represented by the uprights 22 or studs 22 against the foundation 12 or fixed relation with respect to the foundation 12, particularly in the transverse direction 21c.

Just as the first floor of a building will have a sill plate 20 on the foundation 12, upper floors also sill plates 32. Typically, the sill plate 32 will sit on top of flooring 30 supported by the joists 28 and header 26. The amount of wood exposed crosswise to the grain may be substantial. That is, the sill plate 20, the top plate 24, the joists 28, the header 26, the flooring 30, and the sill plate 32 are all subject to cross-grain shrinkage. The longitudinal length on the uprights 22 is less susceptible to shrinkage.

As the system 10 is built up as multiple stories of floors, two needs become evident. The first is to anchor each of the floors to the foundation 12. The other need is to take up any slack due to wood shrinkage. If wood shrinkage is less, such as in structures manufactured of kiln-dried lumber, the need for taking up shrinkage, or the slack induced in the rod 18 as a result of shrinkage, of wood may be minimized. Regardless, the hold-down devices 11 will be required. Where shrinkage is significant, the use of the hold-downs 11 may be augmented with the take-up units 40.

In the illustrated embodiment, each of the hold-downs 11 may be formed to have a base portion 34. The base portion 34 is held down with the anchor 14 or the rods 18 forming the anchor 14 as it extends up from the foundation 12. Extending above the base portion 34 are flanges 38. In certain embodiments, the hold down 11 may be formed of a piece of strap or plate metal, such as steel. Accordingly, the base plate 36 or bearing plate 36 may be formed of a thicker material in order to support bending loads, resisting them to keep the base portion 34 of the hold-down device 11 flat against the sill plate 32. Thus, the bearing plate 36 supports a compressive load exerted by the rods 18 against the sill plates 32 and into the uprights 22, securing the entire structure against the foundation 12.

In the illustrated embodiment, take-up units 40 are included. Take-up units 40 are not required. That is, the retainers 42 or fasteners 42 securing the take-up units 40 to the rods 18 may be used directly against the bearing plates 36. Nevertheless, if shrinkage is a concern, then a take-up unit 40 may be installed between the retainer 42 and the bearing plate 36.

The foundation 12 acts to hold down the anchor 14 extending by way of the rods 18. The rods then transfer load into the retainer 42. The retainer 42 exerts a force down against the bearing plate 36, either directly or through a take-up unit 40. In either event, the bearing plate 36 provides a compressive load against the sill plate 32 and the header 26 and joists 28 therebelow. The header 26 and joists 28 apply a compressive load onto the top plate 24. The top plate 24 transfers the compressive load into the uprights 22. Ultimately, the uprights 22 apply a compressive load to the sill plates 32 of floors therebelow, ultimately arriving at the initial sill plate 22 on the foundation 12.

The take-up units 40 may be stacked. Again, take-up units 40 are not necessarily required. However, if shrinkage is a matter of concern, then a take-up unit 40 may be installed on top of a bearing plate 36, and underneath a retainer 42. As a building is designed to have multiple stories, shrinkage in lower floors may cause a cumulative effect. That is, if each floor experiences one inch of shrinkage, then the stack up of four floors could add four inches of shrinkage. In the illustrated embodiment of FIG. 1, the foundation 12 is shown as concrete with a single sill plate 20. In other embodiments, a foundation 12 may also include a header 26 and joists 28 providing a floor that is supported by the joists 28 instead of by the concrete of the foundation 12.

Thus, any floor that has shrinkage, may be accommodated. If each floor has an amount of shrinkage, that shrinkage is not accommodated by the rods 18. That is, each rod 18 is substantially fixed in length. Accordingly, as a building settles due to shrinkage, the rod 18 does not. Thus, the slack developing in a first floor is additive to the slack developing in a second floor.

Similarly, the slack developing above a third floor is cumulative of the shrinkage of the third floor, as well as the shrinkage of all the floors therebelow. Ultimately, in the illustrated embodiment, the shrinkage of all four floors is cumulative and all appears above the top floor. Accordingly, a large take-up device 40 may be required on the upper floor. Alternatively, various take-up devices 40 may be stacked on top of one another in order to achieve the total capacity required to take up all slack developing above the highest floor protected.

In the illustrated embodiment, each of the flanges 38 of the hold downs 11 may be secured to the uprights 22 by suitable fasteners 43. The fasteners 43 may include, for example, nails, screws, or the like. In an apparatus and method in accordance with the invention, the flanges 38 may be sized to have a length sufficient to hold the required loading.

For example, the nails 43 or other fasteners 43 securing each flange 38 to an upright 22 must hold a certain load in shear. Accordingly, the upright 22 itself must hold that load. Meanwhile, fasteners 43 such as nails 43 cannot be spaced too closely with respect to one another in wood, lest the wood should split. Thus, the fasteners 43 need to be distributed along the length and width of each of the uprights.

Accordingly, the dimensions of the flanges 38 may be designed to have the proper number of apertures for receiving fasteners 43, spaced at the top or distances along the length and width of each of the uprights 22 affected. Thus, the hold-down 11 will distribute the tensile load into the upright 22 by way of the shear loading between the flanges 38 and the fasteners 43. By suitable design of the dimensions of the flanges 38, the forces can be balance between what the fasteners 43 can hold, what the uprights 22 can hold, and what the flange 38 can hold. Accordingly, the hold-down devices 11 may be designed for the proper rating according to the application contemplated.

Meanwhile, the bearing plate 36, and the dimensions of the base 34 connecting to the flanges 38 may be designed to support the compressive load applied by the rods 18 to the hold-down device 11 as well as the tensile load securing the uprights 22 downward in tension.

Figure 2:
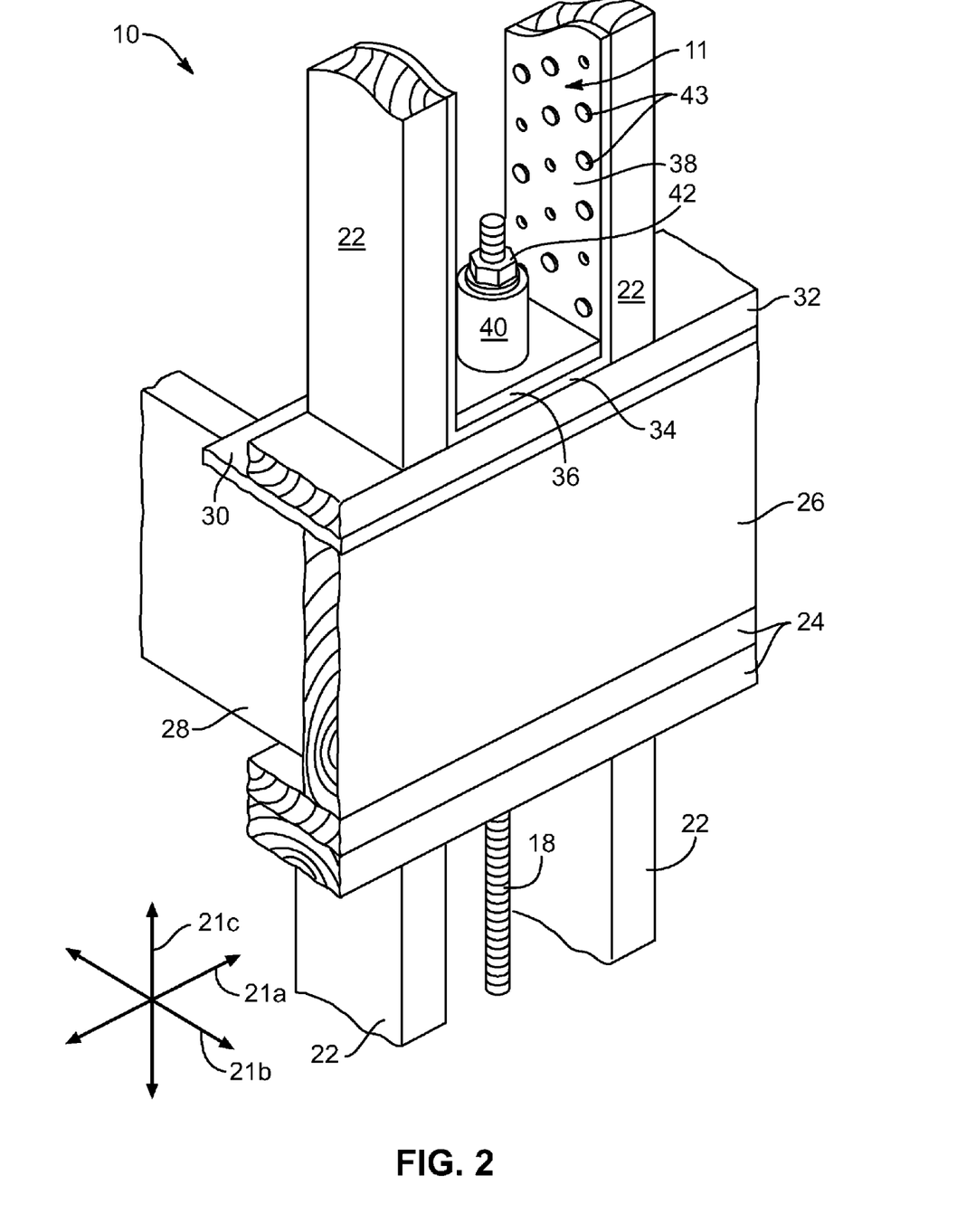
FIG. 2 is a perspective view of one embodiment of a hold-down implemented in accordance with the invention.

Referring to FIG. 2, while referring generally to FIGS. 1-8, an apparatus 10 or system 10 in accordance with the invention may be implemented by installing a hold-down 11 designed to provide a balanced loading on two uprights 22. For example, a hold-down 11 may be designed to have two flanges 38 extending from a base portion 34. The base portion 34 may be captured under a bearing plate 36 retained with respect to a rod 18 serving as an anchor 14. Typically, the bearing plate 36 is located in a position to bear against the top plate 24 (e.g. against a sill plate 32 on the top plate 24) of a floor being tied down to a foundation 12. Meanwhile, the flanges 38 extend upward in a transverse direction 21c to anchor at various locations to the uprights 22 or studs 22.

In the illustrated embodiment, fasteners 43, such as nails, screws, or the like, penetrate apertures in the flange 38 and provide resistance in shear against any relative motion between the flanges 38 and the uprights 22. Accordingly, the fasteners 43 tie the uprights 22 down against the sill plate 32. Typically, the flanges 38 experience primarily tension, restrained by the bearing plate 36 under the load applied by the retainer 42. An optional take-up unit 40 may be interposed between the retainer 42 and the bearing plate 36 in order to take up any slack that may occur within the stack up of wood components such as the top plate 24, header 26, joists 28, the sill plate 32, flooring 30, and the like.

In the illustrated embodiment of FIG. 2, the flanges 38 may be within the envelope of a pair of at least two uprights 22. This provides easy access to the uprights 22 in order to apply wall coverings, such as sheet rock, paneling, and the like Referring to FIG. 3, an alternative embodiment of a system 10 in accordance with the invention may involve a hold-down 11 having a flange 38 more accessible for applying fasteners 43. In this embodiment, the fasteners 43 as well as a portion of the flanges 38 extend to an outer surface of the uprights 22. Alternative embodiments of hold downs 11 suitable for providing balanced loading of uprights 22 may be found in the patents incorporated hereinabove by reference.

Figure 4:
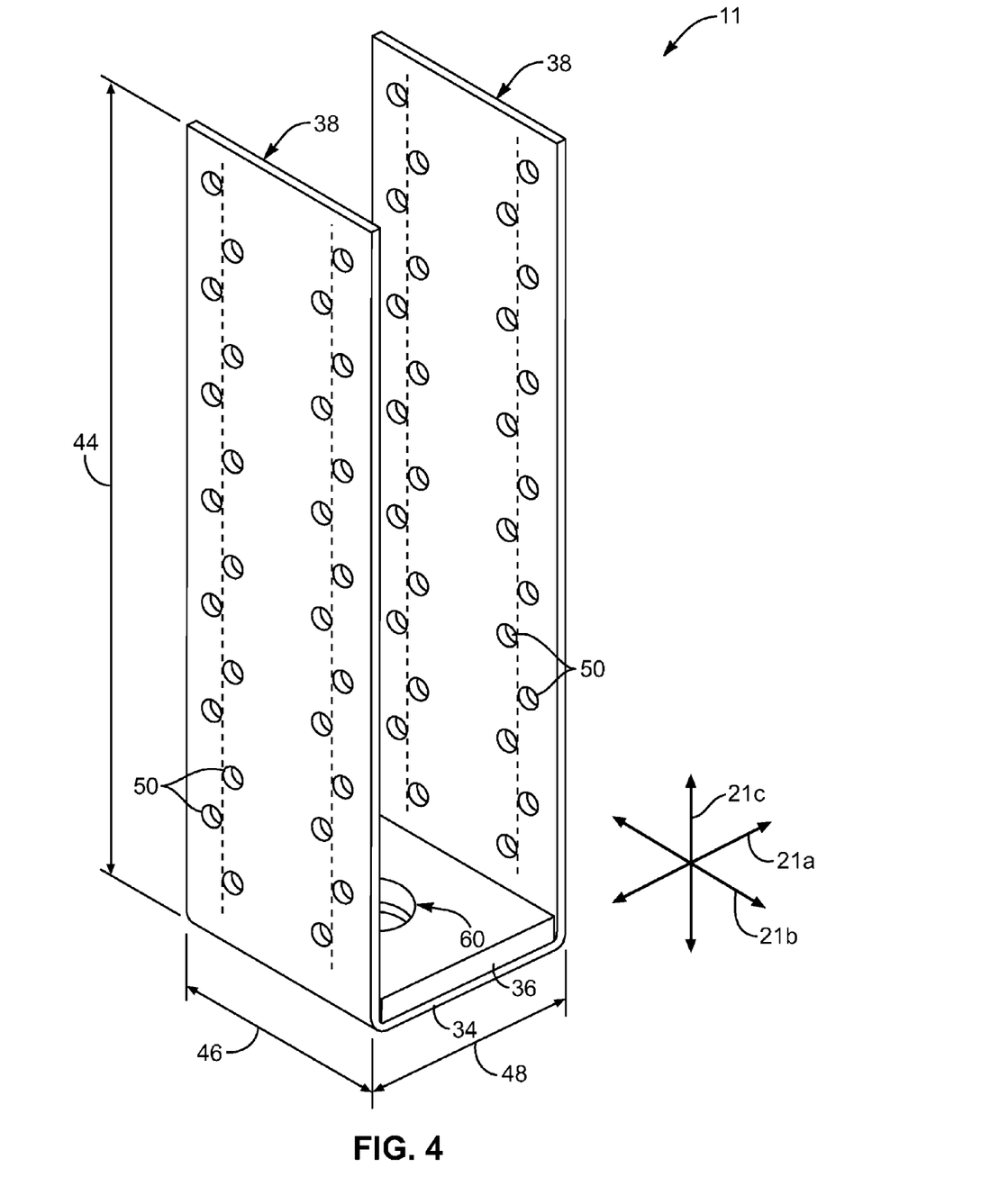
FIG. 4 is a perspective view of the hold-down of FIG. 2.
Figure 5:
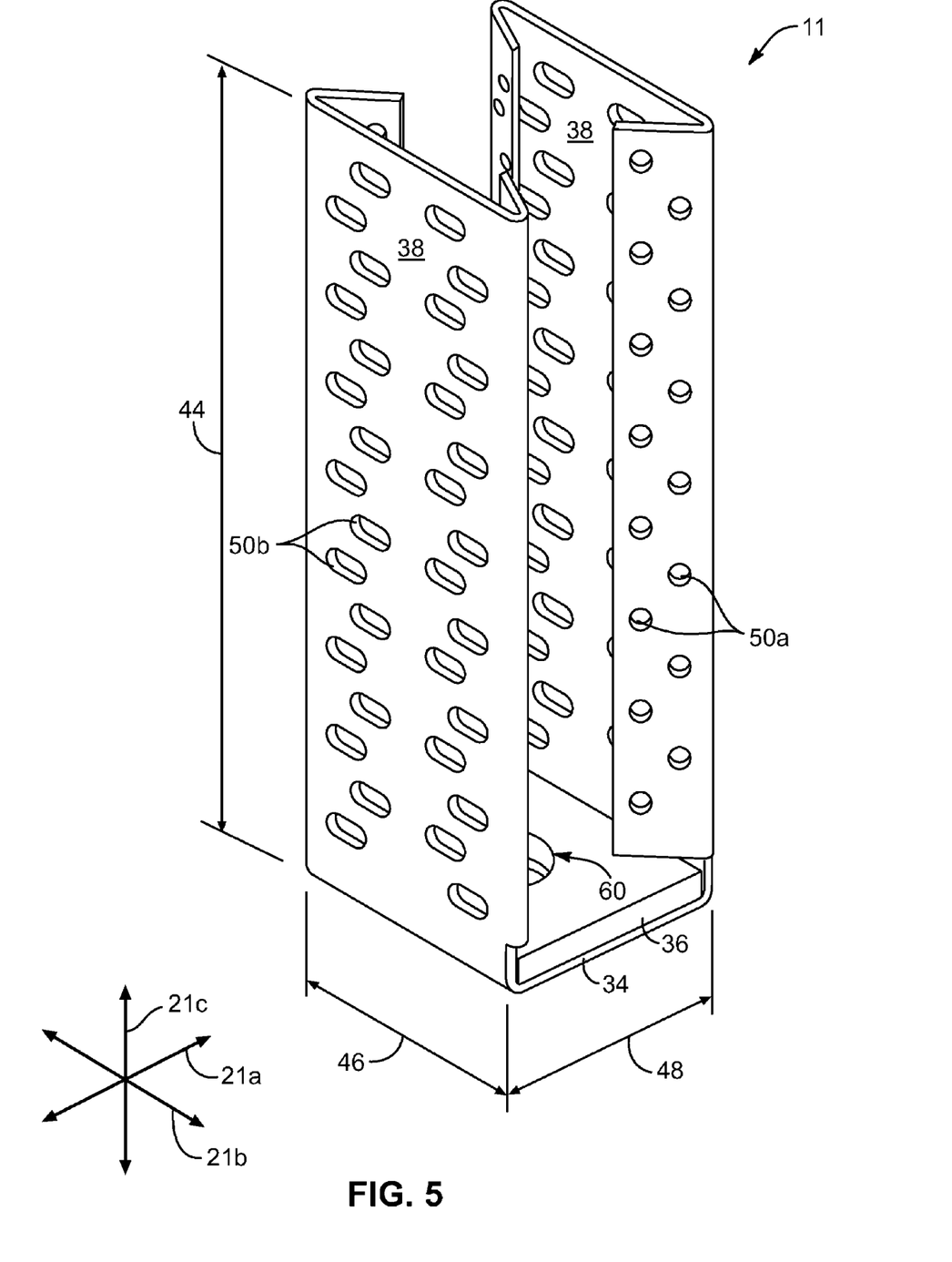
FIG. 5 is a perspective view of an alternative embodiment of a hold-down in accordance with the invention.
Figure 6:
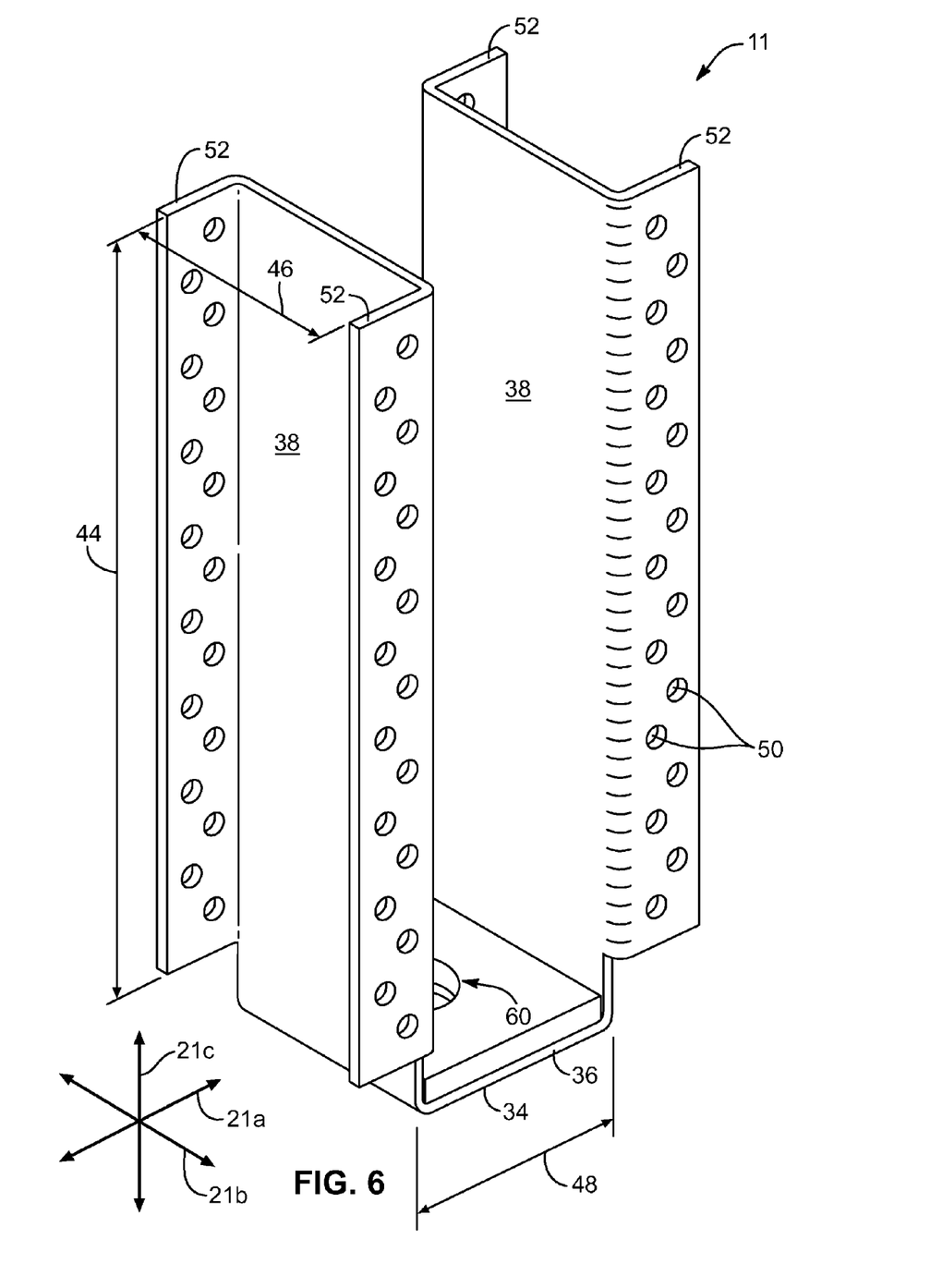
FIG. 6 is a perspective view of one embodiment of the hold down of FIG. 3.

Referring to FIGS. 4-6, various alternative embodiments of hold-downs 11 may be designed according to the specific application. For example, in the illustration of FIG. 4, the hold-down 11 includes flanges 38 designed to have a length 44 extending in the transverse direction 21c. Likewise, a depth 46 in the lateral direction 21b fits along the corresponding dimension of an upright 22.

The spacing provided along the width 48 of the tie down 11 may be selected to promote optimum access by a nailer or other fastener. Thus, the apertures 50 are more accessible to receive fasteners 43 and tools suitable for inserting the fasteners 43, if the width 48 is increased. Accordingly, the width 48 may be designed to provide suitable access to the apertures 54 applying fasteners 43.

Likewise, the apertures 50 may be offset from one another and spaced apart in each suitable dimension in order to provide better integrity for the uprights 22. For example, if fasteners 43 are positioned too close together, they may damage the wood of the uprights 22 by splitting, or the like. Accordingly, all the apertures 50 may not be used. Moreover, spacing between the apertures 50 may be calculated to optimize the protection of the integrity of the uprights 22.

Also, the length 44 of the hold-down 11 may be selected to distribute the apertures 50 for receiving fasteners 43 along a sufficient length in the transverse direction 21c to provide a resistance to splitting of the wood of the underlying uprights 22 or studs 22.

The bearing plate 36 may be selected having dimensions to fit within the hold-down 11 while maintaining its dimensions without substantial deflection. For example, an aperture 60 in the base portion 34 of the hold-down 11, as well as in the bearing plate 36 provides access for the rods 18 of the anchor system 14 to pass therethrough. Nevertheless, upon application of a retainer 42 or a take up device 40, the bearing plate 36 must be designed to maintain its dimensions substantially undeflected. Typical deflections are less than small fractions of an inch.

The length 44 distributes the apertures 50 and corresponding fasteners 43 along a particular portion of an upright 22 restrained by a hold-down 11. The hold-down 11 may be engineered to provide suitable dimensions of thickness and area in the flanges 38 in order to assure the capacity to support required loads. Likewise, the number and location of the apertures 50 as well as the size and load ratings for the fasteners 43 may insure that appropriate shear support exists, transferring loads from the flanges 38 into the uprights 22.

Referring to FIG. 5, the apertures 50 of flange 38 of a hold-down 11 may be sized and shaped to optimize both strength and ease of application. For example, in the illustration of FIG. 4, the apertures 50 may be oriented to receive fasteners 43 at an angle other than a right angle with respect to a surface of a flange 38. Alternatively, apertures may be elongated.

In yet another embodiment, as illustrated in FIG. 5, a portion of the flange 38 may be folded to provide a guide aperture 50 to receive a fastener 43 therethrough. A fastener passing through a guide aperture 50a tends to orient a fastener 43 such that it will pass at an angle through an elongated aperture 50b. Accordingly, installation is simpler, fasteners 43 are stabilized and appropriately oriented, and the angle of engagement between the fastener 43 and the upright 22 penetrated behind the flanges 38 may be controlled.

Again, the appropriate dimensions may be selected to provide a balance within suitable tolerances between the various loads that must be carried. For example, the loading capacity of the base portion 34 in securing the flanges 38 in a transverse direction 21c establishes certain design parameters. Likewise, the deflection and strength of the bearing plate 36 gives rise to other design parameters.

Similarly, the length 44 of each of the flanges 38 provides limitations on the number and disposition of fasteners 43, as well as the load supported. This length 44 may be selected in order to balance the capacity of the base plate 44 or base portion 44 to sustain loading and the flanges 38.

Likewise, the number and locations of fasteners 43, whether or not every aperture 50 is serviced, may be designed to balance a load carried from the anchoring rod 18 through the bearing plate 36 to the flanges 38, and ultimately to the uprights 22 or studs 22 being secured in the transverse direction 21c.

Figure 3:
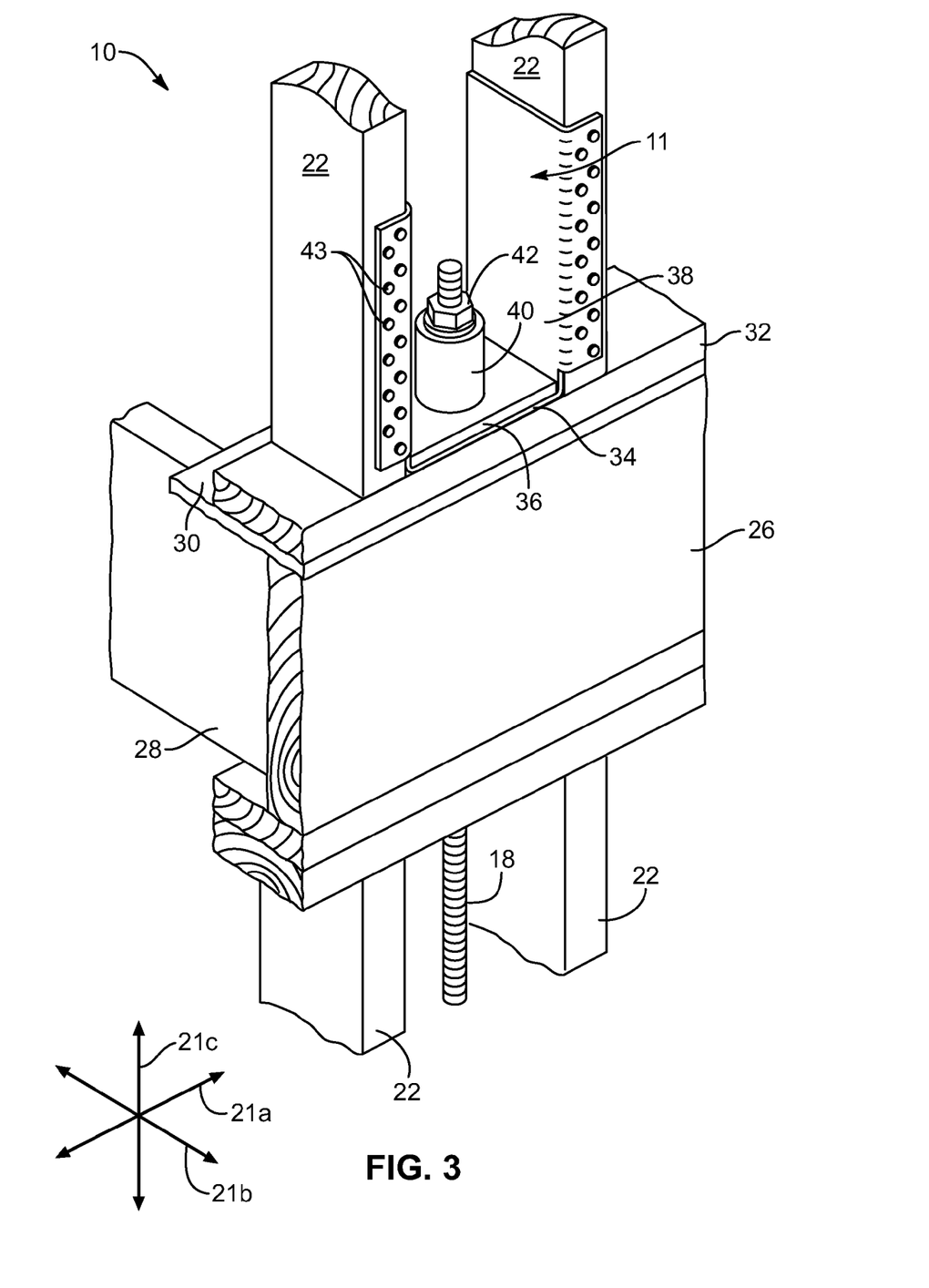
FIG. 3 is a perspective view of an alternative embodiment of a hold-down manufactured and installed in accordance with the invention.

Referring to FIG. 6, one alternative embodiment of a hold-down 11 in accordance with the invention corresponds to the installation of FIG. 3. In the illustrated embodiment, the flanges 38 may wrap around an upright 22 with a securement portion 52 or extension 52. For example, each flange 38 may fit against a surface of an upright 22, yet wrap around at a right angle to also access another face of the upright 22. Accordingly, the apertures 50 may receive fasteners 43 securing the flange 38 to the uprights 22. The embodiment of FIG. 6 provides easier access by a worker to place the fasteners 43 through the apertures 50 into the uprights 22. Nevertheless, the presence of the extensions 52 may be unwelcome in certain circumstances, such as residential or other constructions where sheet rock is to be placed flush against the studs 22 or uprights 22.

Figure 7:
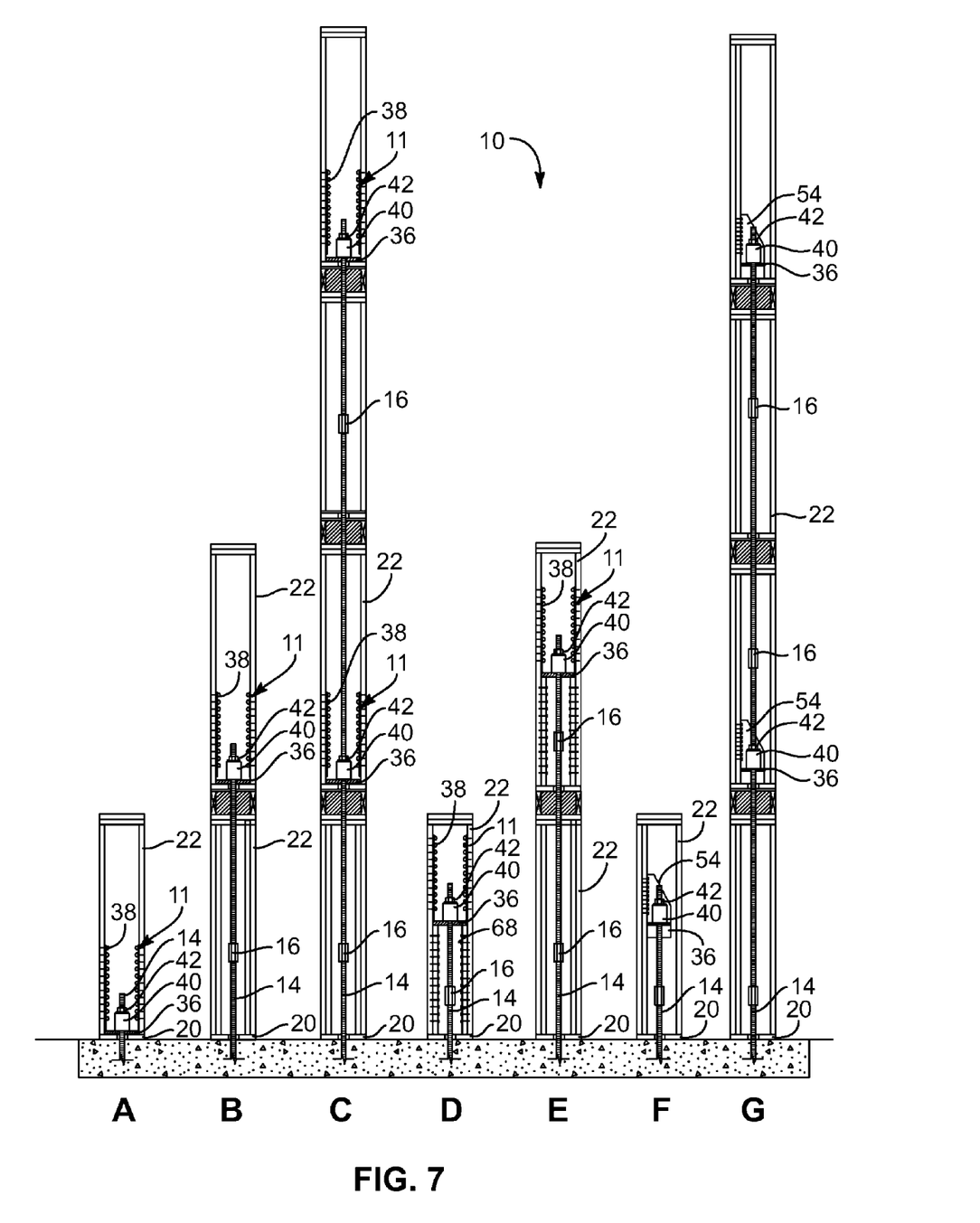
FIG. 7 is a schematic elevation view of various implementations of apparatus and methods in accordance with the invention.

Referring to FIG. 7, several installations of a system 10 in accordance with the invention are illustrated side-by-side. In the illustrated embodiment of configuration A the hold-down 11 may be of any suitable type discussed hereinabove. Likewise for embodiments A through G of FIG. 7, the hold-down 11 may be of any type. One benefit to the balanced hold-downs 11 is the minimization of loads in the longitudinal direction 21a as a result of bending of the uprights 22.

In configuration A, the hold-down 11 secures the uprights 22 against the foundation 12. Actually, the uprights 22 are secured against the sill plate 20. Nevertheless, the anchor 14 by means of the retainer 42 threaded thereon applies a downward force in the transverse direction 21c on the bearing plate 36. Accordingly, the sill plate 20 may be secured by the force thereof. Nevertheless, this same applied force acting through the bearing plate 36 causes the flanges 38 in the transverse direction 21c toward the foundation 12 to provide anchoring.

Configuration A is not the one of most interest. In various alternative embodiments, a hold-down 11 may secure a single floor structure to its foundation 12. However, configuration B illustrates how anchor 14 extended through a coupler 16 may connect through a retainer 42 and optional take-up device 40 to a hold-down 11 that anchors two floors. For example, the flanges 38 secured to the uprights 22 as discussed hereinabove hold down the second floor. Meanwhile, the base plate 36 and the base portion 34 of the hold-down 11 secure the first floor in the direction of the foundation 12.

Again, by suitable design of the length 44 of a hold-down 11, a sufficient portion of the uprights 22 may be engaged by fasteners 43 in order to assure the proper loading on the uprights 22 in the second floor, as well as the loading on the uprights 22 of the first floor. Doubling up of the uprights 22 may be done in any of the configurations illustrated in FIGS. 1-8, depending on the structural recommendations for the uprights 22, the configuration, the loads, possible deflections, and the like.

In the configuration B of FIG. 7, the hold-down 11 is constructed to provide the requisite force to hold down the uprights 22 of the second story. Meanwhile, the bearing plate 36 is sized (and the retainer 42 with any optional intervening take-up device 40) to sustain the necessary compressive force in the seat or the base plate 34 of the hold-down 11 to apply the forces required to hold the first floor securely with respect to the foundation 12.

Embodiment C of FIG. 7 is the expansion of the principles of the hold-down 11 to a four-story structure. In the illustrated embodiment, hold-downs 11 installed in the second and fourth floors have the effect of holding down the second and fourth floors, respectively, with the securement capacity of the flanges 38 of the hold-downs 11. Meanwhile, the bearing plates 36 provide the compressive loads restraining the first and third floors. Thus, a system 10 in accordance with the invention, provides for savings approaching fifty percent in the cost of tie-downs 11 and optional take-up devices 42 used in construction. Meanwhile, all of the floors serviced are restrained to support the foundation 12 with the requisite force rated for those floors.

Referring to FIG. 7, and configurations D and E, a hold-down 11 in accordance with the invention, may be installed mid-floor in an installation in order to improve the force capacity applied to that floor. For example, in these illustrated embodiments, a hold-down 11 extends along the uprights 22, but the bearing plate 36 is positioned on top of trimmers 69. The trimmers 69 are nailed or otherwise fastened against the uprights 22 of the respective floor. The nailing of trimmers 69 against the uprights 22 improves the section modulus of the uprights 22, but also transfers load from the bearing plate 36 into the uprights. Thus, both the flanges 38 and the trimmers 69 transfer force from the bearing plate 36 into the uprights 22. Accordingly, additional loading may be applied to the uprights 22 restraining them with respect to the foundation 12.

Referring to FIG. 7, configurations F and G illustrate certain embodiments in which a method in accordance with the instant invention may be applied to eccentric hold-downs 54. The eccentric hold-downs 54 may be secured to a single side or a single upright 22. As a practical matter, the single side of uprights may comprise multiple uprights 22 fastened or located together. This may be particularly appropriate, and even necessary since a hold-down 54 of the eccentric type will tend to twist or bend an upright 22. In the illustrated embodiments, the hold-down 54 may be secured with fasteners to an upright 22 with or without a take-up device 40 under the retainer 42. The retainer 42 secures the bearing plate 36 against or along the length of a rod 18, as part of the anchoring system 14.

Again, although take-up devices 40 are illustrated, the configurations F and G of FIG. 7 may be installed to provide holding of all floors with only a take-up device 54 on the even floors. Of course, if a building terminates with an odd number of floors, the top-most floor may be served best by being tied down by an appropriate hold-down device 54. In a building having an even number of floors, only the even numbered floors require a hold-down 54. The hold-down 54 may be secured to the uprights 22 by suitable fasteners, so long as the hold-down 54 has a sufficient length 54 to distribute the loads along the upright 22. Accordingly, the bearing plate 36 directly contacting the bottom or base portions 34 of the hold-down 54 provides compressive loading on the odd-numbered floors.

Accordingly, seating the base portion 34 of each hold-down 54 against the sill plate 32 provides compressive strength retaining or restraining the odd-numbered floor therebelow. Meanwhile, a tensile load in the flanges 38 of the hold-down device 54 transfers forces drawing the uprights 22 down against the foundation 12, or toward the foundation 12.

Although the hold-down devices 11 provide a balanced application of force, and are therefore more structurally stable, they also have the advantage of distributing the load evenly between opposing sets of uprights 22. Nevertheless, in suitable applications, a hold-down 54 of an eccentric type may also be configured to hold down multiple floors. Meanwhile, installations using either the hold-down 11 or the hold-down 54 may benefit from the use of automatic take up units 40 installed to accommodate any shrinkage occurring in the wood therebelow, anywhere between a take up unit 40 and the foundation 12.

Figure 8:
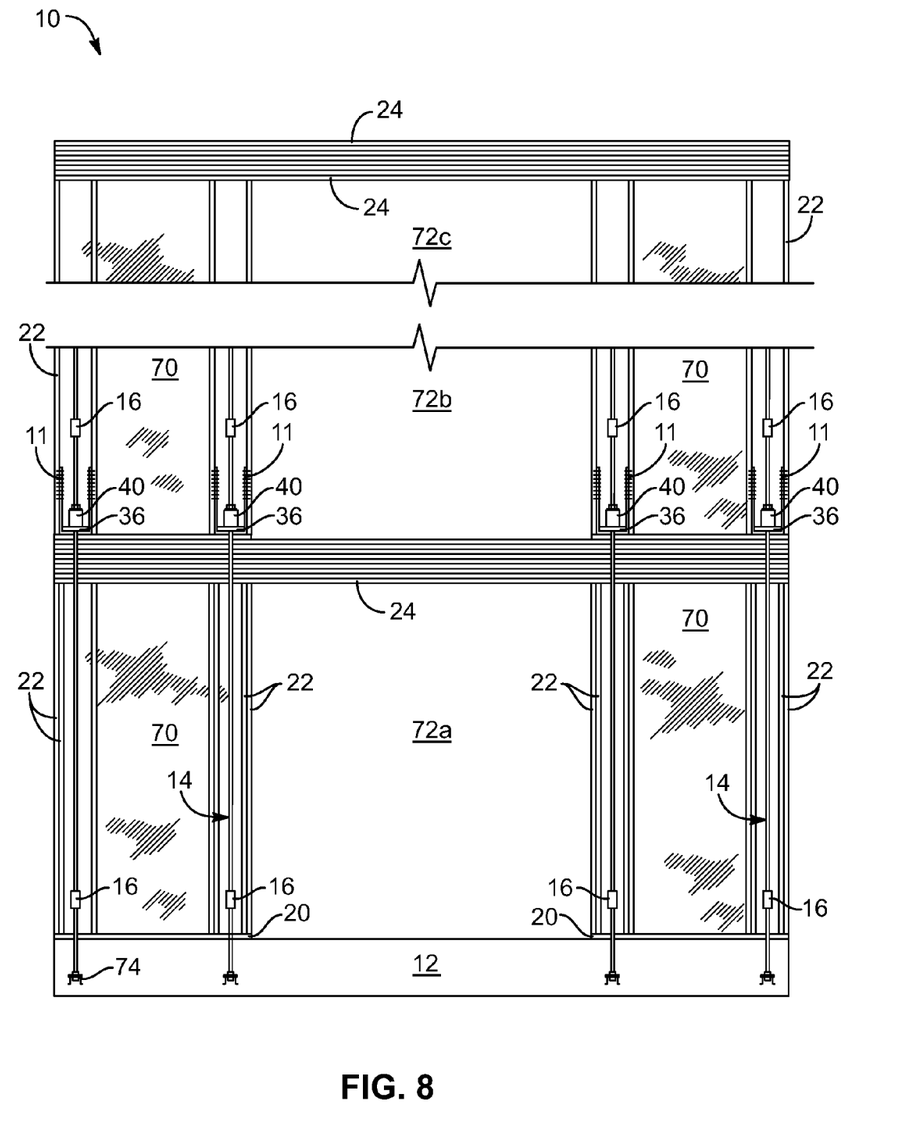
FIG. 8 is an elevation view of one embodiment of a shear wall extending multiple stories and implementing apparatus and methods in accordance with the invention.

Referring to FIG. 8, various shear walls 70 may include portals 72. As a practical matter, the portal area 72 may be filled with a panel just as the shear wall 70. Nevertheless, in the illustrated embodiments, two ends of a wall region are illustrated. In the illustrated embodiment, at least three floors, of any number of floors are illustrated. In general, a first story or first floor may include a portal 72a to receive a door or window. Likewise, a subsequent story may have a portal 72b to receive a door or window, likewise subsequent stories may receive doors or windows to fill a portal 72c. Thus, the floor or story represented by the portal 72c may be a third, fourth, fifth, etc. floor.

In the illustrated embodiment, an anchor 14 may be made of a multiple rods 18 connected by couplers 16. Each of the couplers 16 may extend the anchor system 14 by adding additional rods 18 extending thereabove. At the sill plate 20, 32 of each floor, above the first, a system 10 in accordance with the invention may be provided. Accordingly, a hold-down 11 may be installed to secure the uprights 22 of, for example, the even numbered floors (and the last for regardless). The bearing plate 36 secured by the retainer 42 secures the odd numbered floors therebelow by securing their respective sill plates 20, 32 as well as any other stackup therebelow.

In the illustrated embodiment, the placement of multiple anchors, that is, an anchor on each end of a shear wall 70, the overall wall assembly will be rigidized in spite of the lack of any shear element within the portal 72. All of the attachment procedures and apparatus described hereinabove may be applied in order to install a system 10 at any particular location in the structure of FIG. 8.

From the above discussion, it will be appreciated that the present invention provides novel apparatus and methods directed to a hold-down for securing first and second support members to an anchoring device. The hold-down may have a first and a second flange, each flange having multiple securement apertures to facilitate securement to the first and second support members respectively. A base may connect the first and second flange and have an aperture for admitting and securing the anchoring device. When loaded in application, the first and second flanges may be configured to be loaded in tension.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. A method of securing a multi-story building to a foundation, the method comprising:
    providing a foundation;
    providing an anchor secured to and extending upward from the foundation;
    providing a first wall supported by the foundation and having a first upright extending above and away from the foundation;
    providing a second wall positioned above the first wall and bearing thereon, the second wall comprising a sill member extending horizontally and a second upright extending vertically from the sill member;
    providing a bearing member;
    providing a hold-down device comprising a base portion connected to a flange;
    securing the flange to the second upright in fixed relation;
    restraining the flange vertically by placing the bearing member on the base portion of the holddown;
    positioning the anchor to engage the bearing member;
    restraining the bearing member vertically by securing a first retainer with respect to the anchor;
    vertically restraining the first upright by the bearing member securing the sill member; and
    vertically restraining the second upright by the bearing member engaging the flange, whereby a load path providing an exclusive force anchoring the first wall to the foundation is defined from the foundation, through the anchor, through the hold-down device, to the second wall.

2. The method of claim 1, wherein the first wall extends above the bearing member and the first retainer.

3. The method of claim 1, wherein the first retainer is positioned within the second wall and above the first wall, the first retainer restraining vertically the second wall extending thereabove and the first wall therebelow.

4. The method of claim 1, wherein the bearing member is positioned above the sill member, restraining vertically the sill member with respect to the anchor extending thereabove.

5. The method of claim 1, further comprising holding down the second wall by the bearing member securing the flange and the flange being loaded in tension while applying vertical force to the second wall by way of the second upright.

6. The method of claim 1, further comprising holding down the first wall by the bearing member applying a compressive force through the sill member against the first upright.

7. The method of claim 1, further comprising another first upright and another second upright, the bearing member tensioning the flange to apply a vertical force on the second uprights and compressing the sill to apply a vertical force on the first uprights.

8. The method of claim 1, wherein the anchor penetrates the bearing member.

9. The method of claim 1, wherein providing a flange further comprises providing a penetration in the flange receiving the anchor therethrough.

10. The method of claim 1, wherein the first retainer is positioned along the anchor at a location above the bearing member.

11. The method of claim 1, wherein the first retainer sustains the load path securing the first wall to the foundation, the load path passing from the foundation to the anchor, to the first retainer, to the bearing member, to the sill member, and into the first upright.

12. The method of claim 1, wherein the first retainer sustains sustains the load path securing the second wall with respect to the foundation, the load path passing from the foundation, through the anchor, through the first retainer, through the bearing member, through the flange, and into the second upright.

13. The method of claim 1, further comprising providing a take-up device between the retainer and the bearing member by providing a base and slide fitted together and connected to a biasing element urging relative motion therebetween to effect at least axial relative movement therebetween and taking up slack developing between the retainer and the bearing member.

14. A method of anchoring walls in multiple stories of a building by a single retainer, the method comprising:
    providing a foundation;
    providing an anchor secured to the foundation;
    providing a first wall supported by the foundation;
    providing a second wall supported by the first wall;
    securing the second wall to the foundation by a hold-down device attached directly to and vertically securing an upright member of the second wall to the anchor; and
    securing the first wall to the foundation exclusively by the second wall securing the first wall below the second wall, whereby a load path of a force anchoring the first wall to the foundation is defined from the foundation, through the anchor, through the hold-down device, to the second wall.

15. The method of claim 14, wherein the hold-down device is located inside the second wall.

16. The method of claim 15, wherein the first wall comprises first uprights, the second wall comprises second uprights, the hold-down device secures to the second uprights, and the second uprights transfer loading to the first uprights.

17. The method of claim 16, further comprising creating a load path from the foundation passing sequentially to the anchor, to a retainer secured to the anchor, to the hold-down device secured by the retainer, to the second uprights, to the sill, and into the first uprights.

18. The method of claim 17, further comprising holding symmetrically by the hold-down device two of the second uprights, loaded substantially equally.

19. A method comprising:
provide a foundation;
providing an anchor secured to the foundation;
providing a first wall supported by the foundation and having a first upright extending thereabove and away therefrom;
providing a second wall positioned above the first wall and bearing thereon, the second wall comprising a sill member extending horizontally and a second upright extending vertically therefrom;
providing a bearing member;
securing the bearing member to vertically restrain the second upright with respect to the anchor;
restraining the bearing member vertically with respect to the anchor;
restraining the first upright vertically by compressive forces applied thereon by the second upright;
positioning a first retainer within the second wall restraining vertically the second wall;
positioning the bearing member above the sill member, restraining vertically the sill member;
holding down the second wall by the bearing member securing a flange loaded in tension to apply vertical force to the second upright;
holding down the first wall by compressive force from the second wall to the first upright;
providing a load path passing from the foundation to the anchor, to the first retainer, to the bearing member, to the sill member, and into the first upright; and
providing a load path passing from the foundation, through the anchor, through the first retainer, through the bearing member, through the flange, and into the second upright.

20. The method of claim 19, further comprising providing a take-up device between the retainer and the bearing member by providing a base and slide fitted together and connected to a biasing element urging relative motion therebetween to effect at least axial relative movement therebetween taking up slack developing between the retainer and the bearing member.

* * * * *